(12) United States Patent
Zeller et al.

(10) Patent No.: US 7,054,461 B2
(45) Date of Patent: May 30, 2006

(54) AUTHENTICATING PRINTED OBJECTS USING DIGITAL WATERMARKS ASSOCIATED WITH MULTIDIMENSIONAL QUALITY METRICS

(75) Inventors: Claude Zeller, Monroe, CT (US); Donald G. Mackay, Roxbury, CT (US); William Kilmartin, West Haven, CT (US); Robert A. Cordery, Danbury, CT (US); William A. Brosseau, Stratford, CT (US); Hugh L. Brunk, Portland, OR (US); Stephen K. Decker, Lake Oswego, OR (US); Jun Tian, Tualatin, OR (US)

(73) Assignees: Pitney Bowes Inc., Stamford, CT (US); Digimarc Corporation, Beaverton, OR (US)

( * ) Notice: Subject to any disclaimer, the term of this patent is extended or adjusted under 35 U.S.C. 154(b) by 424 days.

(21) Appl. No.: 10/077,354

(22) Filed: Feb. 15, 2002

(65) Prior Publication Data

US 2003/0156733 A1 Aug. 21, 2003

(51) Int. Cl.
*G06K 9/00* (2006.01)

(52) U.S. Cl. .................. 382/100; 382/103; 382/112
(58) Field of Classification Search ........... 382/100, 382/103, 112, 183, 237, 165; 355/40; 283/93, 283/74; 358/1.9, 1.15, 1.16; 428/206; 356/71; 250/556; 380/252, 201, 210; 347/43
See application file for complete search history.

(56) References Cited

U.S. PATENT DOCUMENTS 5,091,966 A * 2/1992 Bloomberg et al. .......... 382/21
5,559,933 A * 9/1996 Boswell .................. 395/114
5,768,426 A 6/1998 Rhoads .................. 382/232
5,825,892 A 10/1998 Braudaway et al. .......... 380/51
5,951,055 A 9/1999 Mowry, Jr. .................. 283/93

(Continued)

FOREIGN PATENT DOCUMENTS

| EP | 0493091 | 7/1992 |
| EP | 0629972 | 12/1994 |
| EP | 1096429 | 5/2001 |
| EP | 1173001 | 1/2002 |
| EP | 1209897 | 5/2002 |
| JP | 406286275 A * | 10/1994 |
| JP | 410051632 A * | 2/1998 |
| JP | 02000078391 A * | 3/2000 |
| WO | WO0173997 | 10/2001 |
| WO | WO0237309 | 5/2002 |
| WO | WO02056264 | 7/2002 |
| WO | WO02059712 | 8/2002 |

OTHER PUBLICATIONS

U. S. patent application Ser. No. 09/645,779, Tian et al., filed Aug. 24, 2000.

(Continued)

*Primary Examiner*—Anh Hong Do

(57) ABSTRACT

The disclosure describes an authentication system and related methods for authenticating printed objects. The system uses an information-based metric along with one or more print quality metrics to provide accurate detection or classification of a counterfeit printed object. The print quality metric evaluates attributes of a subject image associated with the original printer, ink or paper to detect degradation of those operations due to copying operations like an image scanning and halftone printing subsequent to the original printing of the object. The information-based metric measures message symbol errors in an optically readable code, such as a digital watermark.

40 Claims, 7 Drawing Sheets

U.S. PATENT DOCUMENTS

| | | | |
|---|---|---|---|
| 5,974,548 A | 10/1999 | Adams | 713/200 |
| 6,101,602 A | 8/2000 | Fridrich | 713/176 |
| 6,104,812 A | 8/2000 | Koltai et al. | 380/51 |
| 6,233,684 B1 | 5/2001 | Stefik et al. | 713/176 |
| 6,239,818 B1 * | 5/2001 | Yoda | 347/43 |
| 6,246,777 B1 | 6/2001 | Agarwal et al. | 382/100 |
| 6,275,599 B1 | 8/2001 | Adler et al. | 382/100 |
| 6,285,775 B1 | 9/2001 | Wu et al. | 382/100 |
| 6,332,031 B1 | 12/2001 | Rhoads et al. | 382/100 |
| 6,363,162 B1 * | 3/2002 | Moed et al. | 382/112 |
| 6,449,377 B1 * | 9/2002 | Rhoads | 382/100 |
| 6,512,837 B1 | 1/2003 | Ahmed | 382/100 |
| 6,533,385 B1 | 3/2003 | Mackay et al. | 347/19 |
| 6,574,350 B1 | 6/2003 | Rhoads et al. | 382/100 |
| 6,591,009 B1 * | 7/2003 | Usami et al. | 382/165 |
| 6,636,615 B1 | 10/2003 | Rhoads et al. | 382/100 |
| 2001/0008557 A1 | 7/2001 | Stefik et al. | |
| 2001/0024510 A1 | 9/2001 | Iwamura | |
| 2002/0021824 A1 | 2/2002 | Reed et al. | |
| 2002/0031240 A1 | 3/2002 | Levy et al. | |
| 2002/0037093 A1 | 3/2002 | Murphy | |
| 2002/0054355 A1 | 5/2002 | Brunk | |
| 2002/0061121 A1 | 5/2002 | Rhoads et al. | |
| 2002/0064298 A1 | 5/2002 | Rhoads et al. | |
| 2002/0067844 A1 | 6/2002 | Reed et al. | |
| 2002/0076082 A1 | 6/2002 | Arimura et al. | |
| 2002/0095577 A1 | 7/2002 | Nakamura et al. | |
| 2002/0099943 A1 | 7/2002 | Rodriguez et al. | |
| 2002/0105679 A1 | 8/2002 | Haynes | |
| 2002/0176114 A1 | 11/2002 | Zeller et al. | |

OTHER PUBLICATIONS

Van Schyndel et al., "Towards A Robust Digital Watermark," Second Asia Conf. on Computer Vision, Dec. 5, 1995, pp. 504–508.

Wu et al., "Data Hiding in Digital Binary Image," 2000 IEEE, pp. 393–396.

Yeung et al., "An Invisible Watermarking Technique for Image Verification," Proc. Int. Conf. on Image Processing, vol. 1, pp. 680–683, Oct. 1997.

Yeung et al., "Digital Watermarks: Shedding Light on the Invisible," 1998 IEEE, pp. 32–41.

* cited by examiner

U.S. patent application Ser. No. 09/689,226, Brunk, filed Oct. 11, 2000.

U.S. patent application Ser. No. 09/689,293, Tian et al., filed Oct. 11, 2000.

Bender et al., Applications for Data Hiding, IBM Systems Journal, vol. 39, Nos. 384, 2000, pp. 547–568.

Braudaway et al., "Application of Invisible Image Watermarks to Produce Remotely Printed, Duplication Resistant, and Demostably Authentic Documents," Proc. SPIE—Int. Soc. Opt. Eng,. vol. 4314, pp. 351–359.

Communication of Postal Information Using Two–Dimensional Symbols, Draft Under Implementation, Mar. 19, 1998, 21 pages.

NCITS–W1 990124 IS 13660 Proof, 1997, 27 pages.

Schneider et al. "A Robust Content Based Digital Signature for Image Authentication," from 1996 IEEE Int. Conf. on Image Processing.

Tian, "Wavelet–Based Reversible Watermarking for Authentication," Proc. SPIE—Int. Soc. Opt. Eng., vol. 4675, 2002, pp. 679–690.

Tian, "Wavelet–Based Image Compression and Content Authentication," Oct. 22, 2001, Proc. SPIE—Int. Soc. Opt. Eng, vol. 4551, pp. 11–20.

AUTHENTICATING PRINTED OBJECTS USING DIGITAL WATERMARKS ASSOCIATED WITH MULTIDIMENSIONAL QUALITY METRICS

RELATED APPLICATION DATA

This patent application is related to U.S. patent application Ser. No. 10/016,881, filed Dec. 14, 2001 (Now U.S. Pat. No. 6,533,385), which is hereby incorporated by reference.

TECHNICAL FIELD

The invention relates to authentication of valued printed materials and image processing methods for differentiating between originals and copies of printed materials.

BACKGROUND AND SUMMARY

With the increasing availability of high quality and low cost digital imaging devices such as scanners and printers, counterfeiting of printed materials has become an increasingly pervasive problem. In the field of secure printing, a number of optical security features have been developed to combat counterfeiting. These technologies include machine-readable optical features, such as bar codes, holograms, and more recently, digital watermarks. Some of these technologies are not practical for authenticating certain types of printed documents because they involve complex and expensive manufacturing or printing processes.

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting watermarks that are imperceptible to humans in media signals are detailed in the assignee's co-pending application Ser. No. 09/503,881 (Now U.S. Pat. No. 6,614,914) and U.S. Pat. No. 6,122,403, which are hereby incorporated by reference.

Digital watermarks embedded in images may be designed to survive printing and scanning of the images. This type of digital watermark is sometimes referred to as a robust watermark because it survives the distortion of the image signal due to the print and scanning process. The watermarking process starts by embedding the digital watermark in a digital image. The resulting watermarked image is then printed. To read the digital watermark, an image capture device such as scanner or digital camera scans the printed image and generates a digital image. A watermark reader then processes the image to detect the watermark and extract message symbols from it.

Digital watermarks can be used to differentiate between an original and a copy of a printed article. Examples of such techniques are described in PCT Patent Application WO 99/36876. By analyzing attributes of the digital watermark in a suspect item, a watermark reader can differentiate between a copy and an original. For example, changes to the digital watermark, or degradation of it, can differentiate between an original and a copy. Digital watermarks in these types of applications are sometimes referred to as fragile watermarks or semi-fragile watermarks because they are designed to degrade in a predictable way in response to certain types of distortion.

One challenge in using fragile watermarks to authenticate printed articles is determining the nature and extent of the changes of the digital watermark that differentiate originals and copies of a printed item.

The invention provides an authentication system and related methods for authenticating printed objects. The system uses an information-based metric along with one or more print quality metrics to provide accurate detection or classification of a counterfeit printed object. The print quality metric evaluates attributes of a subject image associated with the original printer, ink or paper to detect changes of those attributes due to copying operations like image scanning and halftone printing subsequent to the original printing of the object. The information-based metric measures message symbol errors in an optically readable code, such as a digital watermark.

One aspect of the invention is an authentication system comprising a print quality processor, a message decoder and a classifier. The print quality processor measures one or more print quality metrics from a subject image scanned from a printed object. The message decoder extracts message symbols from the subject image and determines an information metric based on accuracy of the symbols extracted from the subject image. In response to receiving the print quality and information-based metrics, the classifier classifies the subject image as an original or copy as a function of the metrics.

Another aspect of the invention is a method for embedding auxiliary information into an image to be printed on a printed object and used to authenticate the printed object. The method embeds auxiliary information into the image based on a print attribute so that the auxiliary information degrades in response to a copy operation on the printed object. It also embeds print information about the print attribute into the image, such that the auxiliary information includes the print information. The print information includes information about the printer, ink and/or paper that is useful in analyzing an image scanned from the printed object to determine whether the object is a counterfeit.

Yet another aspect of the invention is a printed object authentication system comprising a print quality processor, a digital watermark decoder and a classifier. The print quality processor measures one or more print quality metrics from a subject image scanned from a printed object. The digital watermark decoder detects a digital watermark from the subject image and determines a digital watermark metric based on the detected digital watermark in the subject image. The classifier is in communication with the decoder and processor for receiving the print quality and digital watermark based metrics and classifying the subject image as an original or copy as a function of each of the metrics.

Further features will become apparent with reference to the following detailed description and accompanying drawings.

DETAILED DESCRIPTION

Introduction

Figure 1:
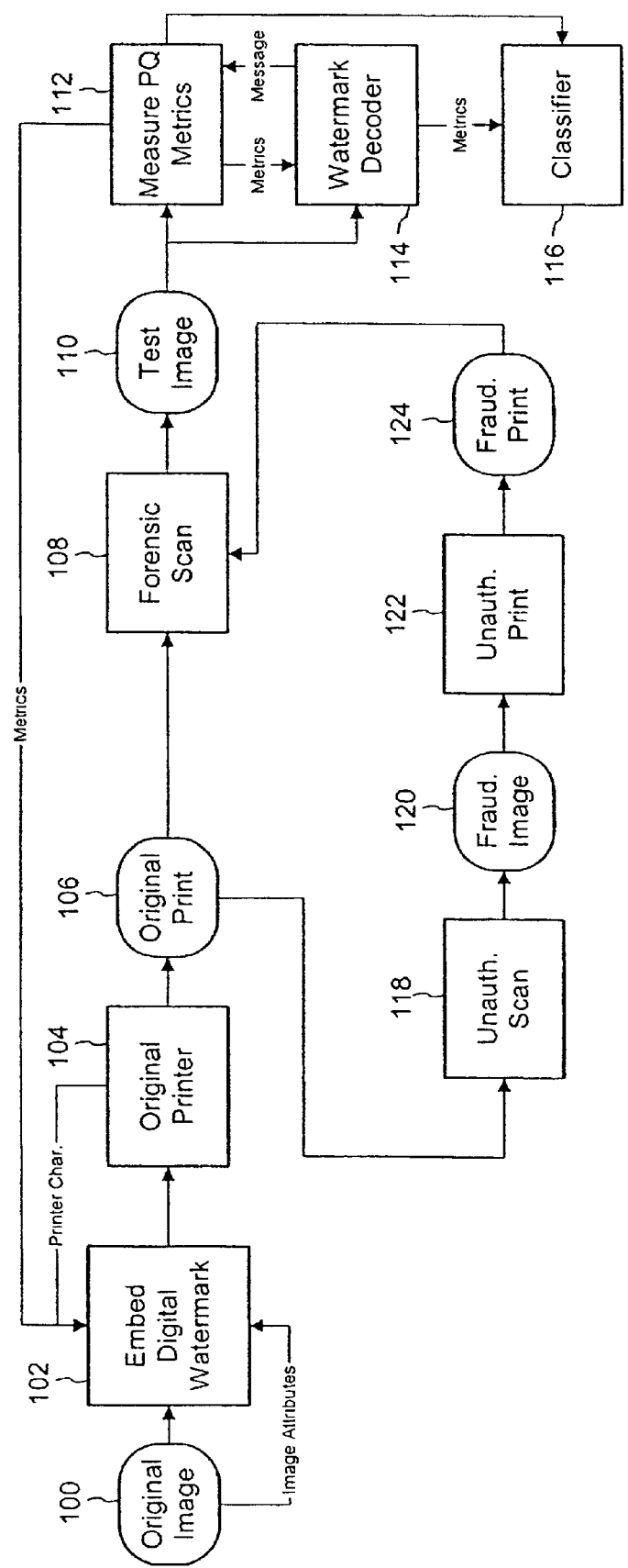
FIG. 1 is a diagram illustrating creation and authentication of printed articles using fragile watermarks and print quality metrics.

The following sections describe a method and system for authenticating valued printed materials such as digital postal marks, tickets, coupons, gift certificates, etc., which may be printed on any substrate, including transparent synthetic materials and traditional opaque materials such as envelope paper used in the mailing environment. This method of authentication also applies to products and packaging materials, thereby providing manufacturers with the ability to identify counterfeit products.

One implementation of the method is based on the use of a machine-readable optical feature carrying an auxiliary signal, such as a digital fragile watermark, associated with (1) specially designed artwork and (2) with numerical data characteristic of the original bitmap image (i.e. perimeter, area, line width, etc.). As an option, these characteristics may be robustly embedded in the machine-readable feature (e.g., the digital watermark), and later extracted from a suspect object and used as parameters to check authenticity. Further, the authentication method can be enhanced when the specially designed artwork enables the measurement of fundamental print quality parameters, non-linearly associated with the loss of information contained in the watermark. The embedded information about the original bitmap can permit an improved normalization of the various quality parameters associated with the information embedded in the watermark.

The artwork may itself by a machine readable indicia like a bar code or some other graphical indicia, such as a brand indicia (e.g., corporate, product or service logo), product symbol, package symbol, etc. This enables the authentication system to be readily adapted for postal applications, like postage meters that print postal indicia, and for other product and product packaging authentication applications.

In one implementation, an authentication system is comprised of an image acquisition device such as a CCD (or CMOS) camera and a digital computing device whose task is to decode the fragile digital watermark and to measure the various metrics (print quality based and information based metrics). The system evaluates the metrics using a classifier, or other metric evaluation process. This process may be, for example, a multi-dimensional classifier based on a statistical model of the metrics measured for copies and originals.

Alternatively, the metric evaluator may test the metrics against a set of thresholds implemented in a look-up table to determine if an image is an original. The thresholds for the information-based metrics may be selected adaptively based on print quality measurements.

Depending on the metric analysis, the system accepts or rejects the document. The process of creating a document authenticated by this system can be incorporated into a standard document printing process, such as a postage meter printing digital postage marks, so that it offers high security at the same cost as standard state of the art digital postage meter and supports automatic document authentication. A document in this context includes any printed object with information.

The use of additional metrics can improve the ability of a digital watermark reader to detect copies of original images bearing fragile digital watermarks by analyzing image quality metrics or other image features of known characteristics, and setting appropriate threshold values to decide if an image is a copy or an original. In addition to other metrics, the digital watermark provides an information-based metric relating to the readability of message symbols embedded in the digital watermark. The distortion due to copying degrades the readability in a measurable way. As the readability of the embedded information signal decreases, the likelihood that the printed object is a copy increases. Taking advantage of this type of information metric, the use of print quality metrics can be used in combination with information metrics derived from other machine-readable optical features, such as bar codes, data glyphs, Optical Character Recognition symbols, etc. Information based metrics can be derived from such features based on a readability of the feature, which degrades in a measurable way due to distortions associated with copying operations.

In the case of digital watermarks, information based metrics are used to quantify the watermark signal strength that indicates the quality of a watermark. Each time the watermark is photocopied or scanned/reprinted, there is a degradation in the information carried by the watermark, and therefore in the value of the associated information metric. This decrease in the value of the information metric enables a watermark copy detector to determine if an image is an original or not. The watermark copy detector includes a watermark decoder and classifier. This process works well when the printing conditions and materials (printer, ink and paper) are well controlled. For a particular set of conditions, an original image can be printed containing a watermark, and the watermark is read and assigned a quality value. When reproduced and subsequently read, this image will achieve a quality level that is significantly lower than the original. An authentication system creates as large a difference as possible between the value of metric of the original and the copy so that it can accurately detect copies of the original image.

A design challenge arises when the system of printing and reading watermarks must be made to work on a wide range of media with a variety of printers that all have multiple printing modes (print quality, resolution, and paper types). For example, if an excellent quality original watermark is printed, it is possible to make a high quality copy of it that achieves a higher quality metric than an original printed under less controlled conditions. In some cases, it is challenging to set a single threshold value for the watermark metric that will accurately detect copies without knowing something about the paper and printing system to be used.

Authentication System

The basic problem in fraud detection is to assess if an image is valid or has been copied. Each step of the copying process (scanning/printing or photocopying) alters the image, degrading the resulting print quality of the image, and the signal strength of the embedded message signal (e.g., digital watermark message).

In this document, we detail a method to compensate for variations in the printing circumstances, thereby enabling the authentication system to set the correct threshold in order to decide if the printed document is an original or a copy. Compensating for variations induced in the copying process (photocopying or scanning/printing) can be enhanced when two or more independent (or not linearly related) metrics are utilized. In addition, potential counterfeiters who would like to reproduce the original with a photocopying device or by scanning and subsequent printing may only be able to adjust one metric for the whole image and will therefore be unable to eliminate the undesired variations produced by the other independent metrics.

Preferably, the implementer should choose a combination of relatively independent metrics (print quality or information based), each that is particularly well suited for measuring various changes due to copying operations. While the counterfeiter may be able to reduce degradation due to any one of these effects, the combination of two or more metrics that measure different effects makes it less likely that the counterfeiter will avoid creating at least one of these effects, and thus, makes the authentication system more effective in detecting copies. As shown in more detail below, it is therefore beneficial to use a combination of metrics that measure effects of copying on paper color, ink color, printer characteristics, print growth, embedded information, etc.

FIG. 1 is a diagram illustrating creation and authentication of printed articles using print quality metrics in combination with an information-based metric derived from digital watermarks embedded in an image (100). To create a printed object, a digital watermark embedder (102) encodes a digital watermark in an original digital image (100). The digital watermark carries a message payload comprising a set of message symbols. This message includes binary or M-ary symbols that can represent a variety of types of information. For example, the message may include parameters about the original image, such as attributes of art work features in the image, that may be used to measure print quality metrics. The message may also include information about the printer or printing operation that may be used to identify the appropriate print quality metrics.

Once created, an original printer (104) receives and prints the digital image bearing the digital watermark. This creates an original print (106). In the specific case of digital postage, the original print may be an envelope with postal indicia bearing the digital watermark printed on it. Preferably, the system is tuned for a particular type of printer and print substrate. In some cases where the original image is under the control of the issuer, the original image is also designed specifically to carry the digital watermark in a manner that will improve accurate distinction between an original and copy.

As part of this tuning process, the forensic scanner (108) used in authentication is used to scan printed originals, as well as sample fraud prints, to measure metrics and establish classification rules used to distinguish between an original and a copy. The forensic scan of a print produces a test image (110). A set of authentication modules process the test image to calculate metrics based on print quality and based on information metrics, namely the digital watermark metrics.

The authentication modules include a print quality processor (112), a digital watermark decoder (114), and a classifier (116). The print quality processor measures one or more print quality metrics. Several examples of these metrics are detailed further below. In some cases, the watermark message payload includes information used to evaluate the print quality metrics. For example, the message payload may include an image attribute parameter or an index to a parameter in a database. The print quality processor uses the attribute parameter, such as spatial dimensions of an artwork feature, to measure a print quality metric, such as print growth.

The digital watermark decoder (114) also measures digital watermark metrics. These metrics analyze the strength of the watermark. In some cases, the print quality metrics may by used to set thresholds for digital watermark metrics.

The classifier (116) analyzes all of the data derived from the test image, including the print quality parameters, the digital watermark metrics, and in some cases, information about the printer in the watermark payload, and classifies the test image as being derived from a copy (a fraud) or an original print.

In the tuning process, the measurements of print quality and digital watermark strength in a forensic scan of the original print establish a reference for measurements in the fraud images. The tuning process also includes measurements of print quality and digital watermark strength in various types of sample fraud prints. The tuning process plots the metrics measured for originals and sample copies in a multi-dimensional metric space and enables the implementer of the system to establish a classification rule specifying regions in the metric space for classifying different types of printed objects, such as originals, copies made by a printer/scanner, and copies made by a photocopier machine.

In the case of illegal copies, the original print (106) passes through an unauthorized scanning operation (118), which produces a fraud image (120), and an unauthorized print operation (122), which yields a fraud print (124). Such a copy may be made using a digital image scanner and printer of various types, or by using a photocopy machine.

To detect a copy, a forensic scanner (108) scans a suspect item to generate a suspect digital image (110). The print quality processor measures print quality metrics and the digital watermark decoder measures watermark metrics in the suspect digital image as explained above. The classifier receives these metrics and applies the classification rule to them to determine whether the test image has been scanned from an original or copy.

The roots of metrics used to differentiate copies from originals lie in the physics of scanning (optical properties of printed area and surrounding, and quantization process) and printing (ink-paper interaction).

Scanners capture images by shining light onto the document being scanned. The light is then bounced back to a strip of light-sensitive cells such as a charge-coupled device, or CCD.

Since dark areas reflect less light and light areas reflect more light, the CCD can convert the light into digital information called bits for binary digits. The final image is then a reconstruction of this data by the scanning software.

Resolution determines the spatial level of detail recorded by the scanner and is typically measured in pixels per inch (ppi). The greater the ppi number, the higher the resolution. Details are lost due to limited resolution (quantization process) and to blur due to optical and sensor characteristics.

All printing suffers from the phenomena called dot gain. Dot gain is the physical enlargement of printed dots during the printing process caused by uncontrolled spreading of the ink on the printed surface (physical dot gain). In addition, light from the scanner scatters around and under the dots results in an optical increase in dot size (optical dot gain). The phenomenon has been explained by the Yule-Nielsen equation. During the printing and scanning process, the combination of physical and optical dot gain results in total dot gain (tone value increase, or TVI). Both the penetration of ink into the paper and the scattering of light inside the paper are of importance. Dot gain is responsible for what is known in the bar code technology as "print growth."

Paper has a complicated inner structure, made up of fibers, fine material and pores. With characteristic differences for different kinds of paper this structure determines how light propagates inside the paper and how the paper appears in reflected or transmitted light. The optical properties also have a decisive influence on how the print will appear. The structural inhomogeneity of the paper will produce fluctuation of the local optical reflectance of the printed area, which is partially responsible for what is known in the bar code technology as "modulation."

Image Quality Metrics

Bar Code Metrics

There is a relationship between the read rate of two-dimensional bar codes containing print quality defects and the fragility of watermarks subjected to the same type of defects.

The read rate of bar code is quantitatively related to the print quality attributes of the printed image, such as those described in ISO 13660 dealing with print quality of binary monochrome images or those described in two dimensional bar code print quality standards such as AIM BC 11-1997, May 8, 1997.

While the watermark signal strength is an example of a readability metric for watermarks, a readability metric for bar codes is the Unused Error Correction Code UECC. Experience and theoretical analysis show that the readability metrics (which are information based) and image quality metrics are non linearly correlated. The correlation breaks down below a limiting contrast depending on the noise of the print (when the gray level histogram exhibits large peaks).

In cases where the print object being authenticated includes a bar code, such as a postal indicia, the bar code image can provide a variety of metrics. One such metric is an information based metric such as a measure of the symbol errors detected in the bar code.

Another is a contrast measurement of the bar code. One way to measure contrast of the bar code portion of an image is to compute a histogram of the gray levels of that image portion, find the peaks (there should be one for black representing ink color and one for white representing paper color), and then derive contrast from the relative peak locations. For example, contrast, C, can be computed as C=(high peak−low peak)/high peak. This contrast measurement may be used as an input to a classifier or used to adaptively set a threshold for another metric, such as an information based metric like a metric based on the recovery of a digital watermark payload. If the contrast is low, then the quality of the image is low, which indicates that the threshold for the information-based metric should be lowered to require more errors to be detected in the embedded message before the item is deemed a copy. Conversely, if the contrast is high, then the threshold should be increased. When the system detects a lower quality recycled paper due to its lower contrast, it adaptively selects a lower threshold. When it detects high quality glossy paper due to higher contrast, it selects a higher threshold. This type of contrast measurement can be made on a bar code as well as other artwork or features on the subject image, such as a special logo or character font.

Yet another is print growth metric where the black and white bars or blocks of the bar code are measured to detect print growth distortion as described in the next section.

Print Growth and Modulation Metrics

Examples of print quality metrics that impact the information-based metric include print growth and modulation as defined above. The two metrics are independent. Print growth and modulation are normal occurrences during the printing process, and are accepted within measured tolerances. Copies of originals, unless specially corrected for, present more growth and/or modulation than the originals.

Examples of metrics designed to measure distortions due to print growth include metrics that analyze statistics of the widths of black vs. white block structures, such as bar code structures or specially designed artwork in the image.

To illustrate, we describe one metric that measures print growth using features of a 2D bar code. The 2-D bar code is made up of many squares of the same size, white and black. Ideally, the white and black squares should be the same size. The counterfeiting process is subject to print growth, in which dark objects become bigger. If not corrected, a scanned and reprinted counterfeit will thus be darker than the original. This print growth metric calculates a ratio of light and dark block widths ("white-black ratio") to detect growth of the black blocks.

The print quality processor's calculation of the white-black ratio uses a threshold defining "dark" and "light" pixels, which is found by analyzing the bar code's histogram. With the threshold, the print quality processor finds the average widths of dark and light areas for many lines passing through the bar code. In the histograms of runs of dark and light pixel values for an original bar code, there are peaks in both histograms for single, double, etc, bar code blocks, i.e. where a line crossing the bar code passed through one or multiple blocks of the same dark or light tone. For a subject image, the print quality processor finds the white-black ratio by locating the first histogram peak in each distribution, and then taking the ratio of these two values.

This white-black ratio partially separates counterfeit from original bar codes, is particularly effective in separating xerographic counterfeits from originals, and it helps detect counterfeits when combined in the classifier. Our implementation operates effectively on a bar code image that is rotated no more than about 10 degrees from vertical or horizontal. If it is more severely rotated, then the peaks in the run length histograms will not be as strong, and the ratio of peak locations may be incorrect. The geometric synchronization used in digital watermark detection may be used to ensure that the image is aligned to an orientation within this tolerance before measuring the print growth metric.

Perimeter-to-Area Ratio Metrics

Another metric is the Perimeter-to-Area ratio of the printed image bearing the watermark at a predetermined threshold. The threshold is selected in such a way that the thresholded image has the same area as the original bitmap. We discovered that the resulting metric is very sensitive to copy and relative insensitive to the print contrast difference of the printed image.

Modulation Transfer Function Metrics

There is a specific metric that can be used to measure the image degradation due to the scanning process. The image detail lost is determined by the Modulation Transfer Function of the scanner. The Modulation Transfer Function (MTF) is a measure of the response of an optical system to varying intensities of light. It may be represented as the response to parallel lines whose brightness varies from minimum to maximum in a sinusoidal function. If the minimum to maximum is set to 1, then the optical system will generally give a response less than 1. At higher spatial frequencies, the response is less, until at some upper limit, there is no response (i.e. the image would be all gray). Comparing parameters extracted by Fourier analysis of the image scanned for forensic purpose and of the original bit map image respectively, permits one to define a metric that can be used to measure the image degradation due to the copying process.

Tonal Characteristics of an Image Quality Metric

Image quality metrics could be prescribed to be tonal dependent or tonal independent.

The former corresponds to parameters measured directly on the gray scale image or on a bitmap image generated by thresholding the gray scale image at some predetermined gray scale value with respect to the histogram characteristics of the printed image. Such a characteristic makes the image lifted for forensic purpose sensitive to any gamma transformation that the image was submitted to before having been printed.

The latter corresponds also to a thresholded gray scale image, but at a threshold value depending only on some geometrical parameters of the original bitmap that has been used to generate the original print. The metric applied to this type of image is much less sensitive to any gamma transformation that the image was submitted to before having been printed.

Low Pass Blurring Metrics

Low pass blurring generally refers to a class of image degradation that creates a blurring effect. There a variety of potential sources of this distortion, some of which relate to other image quality characteristics listed in this document. One source of low pass blurring is the scanner Modulation Transfer Function, referenced above. Another source is the halftoning process of a printer. There a number of potential metrics that can measure this effect, such as histogram based metrics, frequency based metrics, edge characteristic metrics, and image energy metrics.

Histogram metrics analyze the histogram of pixel values of the subject image. If low pass blurring has occurred, the histogram shape will be distorted in predictable ways. By measuring features of the histogram that are sensitive to these distortions, the authentication system can detect distortion that differentiates an original from a reproduction that exhibits low pass blurring effects.

For original images that consist of a single color ink printed on a white substrate, the histogram should include two clearly defined peaks. The strength, position and shape of the histogram peaks provide evidence of low pass blurring effects.

One example of a histogram metric to measure the blurring effects is one that measures a ratio of the pixels that fall into the area between the two peaks of the histogram to the total pixels. This metric, which is measured on part of the subject image containing a 2D bar code, measures of how much clarity was lost in the image. The print quality processor sub divides a region of the image containing the bar code into equal sub-boxes, and in each, finds the ratio of midrange to total pixel values. Then the least of these ratios is returned as the metric value.

In the calculation, the low (L) and high (H) peak values (0 to 255) are first found. Then a pixel value is called "midrange" if its value is between $L+(1/3)*(H-L)$ and $L+(2/3)*(H-L)$.

If the counterfeiter has scanned an original and then printed the counterfeit, the result will have many more mid-level pixel-valued pixels than the original, because of the blurring effect of the scanner, the halftone conversion by the printer, the production of small dark spots in the white areas by the printer, or any combination. The distribution of the pixel values has two peaks that are stronger in the original than in a print/scan counterfeit.

Low pass blurring also tends to cause modifications in the spectral characteristics of the image. For example, blurring may cause distortion of high frequency signal content and shift energy into lower frequencies. Frequency domain metrics detect these types of modifications.

Low pass blurring also causes distortion around image edges. Metrics that measure the distortion of edge characteristics can detect this type of distortion.

Low pass blurring also impacts other statistical and energy metrics. Specific examples of these types of metrics are provided in further detail below.

Printer Characteristics

In some applications, the type of printer used to print an original item is tightly controlled. This enables the authentication system to analyze attributes of the image that are dependent on printer characteristics. For example, some printers use clusters of dots to perform halftoning. If the original printer does not have this characteristic, then detection of it in a subject image provides evidence of the type of copy.

Printers also have a number of other traits, like the spatial resolution of the ink dots that they print. If an original is printed using a particular dot per inch printer, and the subject image has characteristics that indicate that it was likely printed at another dot per inch, then the system can classify the type of copy based on a metric that detects characteristics associated with a particular dot per inch printing.

A number of image frequency and energy-based metrics can be used to identify the spatial resolution of the printing.

One example of this type of metric is one that computes the maximum energy at the highest spatial frequency of the original printer. In one implementation, the print quality processor calculates the maximum spectrum value between 0.9 and 1.0 Nyquist in any direction, at a sampling rate twice that of the original printer DPI (e.g., 600 DPI sampling is assumed for a 300 DPI printer), and divides by the total energy.

In addition, the halftoning process provides other characteristics. Some halftone screens have tell-tale frequency characteristics that can be measured with frequency domain metrics. Further, the halftone screen frequency and angle can be embedded in the digital watermark payload or programmed into the detector. To compute this metric, the detector reads the screen frequency and/or angle from its memory (if pre-programmed), or extracts it from the watermark payload (if embedded in the watermark payload), and then computes a metric that evaluates whether the subject image was likely printed at the specified screen frequency and/or angle.

Ink and Paper Color

Just as the printer has identifiable characteristics that may be present or absent in a copy, the ink and paper may also have identifiable characteristics. As such, in cases where the ink and paper is tightly controlled, the authentication system can also use metrics associated with the ink and paper.

One characteristic of the ink and paper is the color. An example of a metric that can discern distortions in the color of the ink or paper is a histogram metric that analyzes the histogram of pixel values to look for variations due to changes in color of the ink or paper.

One histogram based metric relating to ink color is a metric that finds the "1% point" on the histogram of pixel values. This metric calculates the pixel value between 0 and 255, which is greater than that of one percent of the pixels in a 2D bar code in the image. It is the low point on the distribution of pixel values, and corresponds closely to the darkness of the ink used. The one percent point is used to avoid noise from outliers. If the original image uses an ink with a different darkness than that produced by ink jet or photo copy counterfeits, this metric can be effective in separating originals from counterfeits.

Printer, Paper, and Ink Characteristics to Tune the Watermark Embedder

In some applications, the printer, paper, and ink used to create originals is controlled and known to the authentication system. In other applications, it is not. One system enhancement is to embed information about the printer, paper, and/or ink characteristics or type into the digital watermark payload. The detector can then extract this information and use it to select the appropriate metric calculations, classifier, or metric thresholds for that printer type, paper type and/or ink type.

There are a number of ways to exploit information about the printer, paper, and/or ink. One way is to embed an index to a document type that can be used to select a classifier for that document type. The document type includes information about the printer, paper or ink type. Another way is to embed codes in the digital watermark message payload that describe the printer, paper and/or ink type. The detector can select the appropriate classifier and/or thresholds for copy detection based on this information.

Similarly, the digital watermark embedder preferably uses knowledge of the printer, paper, and/or ink to control embedding of the digital watermark so that it is optimized to detect copies. In particular, the strength of the digital watermark is tuned for the printer, paper, and/or ink type so that it survives creation of the original printed article, yet degrades in a manner that enables the classifier to reliably distinguish between an original and one or more different types of copies. Using this embedding technique along with a classifier that is adapted to the printer, paper and/or ink type enhances the system's ability to detect copies.

Generating a Classifier

As described generally above, the classifier receives a number of metrics measured from a subject image and classifies the subject image as derived from an original or some type of copy. The classifier classifies the subject image as a function of the metrics measured from that image.

In one implementation, we generated the classifier by experimenting with a variety of metrics on a training set of printed objects. The training set includes originals as well as one or more different types of copies, such as a copy made by scanning an original and re-printing on an ink jet printer, and a copy made by photocopying an original. The experiments generate metric data for each class of subject image. To generate the classifier, our training process groups the metrics measured for these classes into regions in a multi-dimensional metric space.

These regions then form the basis of the classifier. For example, when the classifier receives metrics measured from a subject image of unknown class, it determines its class by mapping the measured metrics to one of the regions established with the training set. The classifier maps the measurements to a particular class by determining the region that is closest to those measurements. A more detailed example will illustrate this aspect of the classifier. Our implementation uses a statistical model classifier, and in particular, a Bayesian classifier. To train the classifier, we take a set of subject images whose class (original, ink jet copy, photo copier copy, etc.) is known and randomly divide it into the training and testing sets. For each metric, the mean and standard deviation of all training values are found and recorded, and the full training data set is normalized to have zero mean and unit standard deviation.

For each metric i, the mean $m_i$ and standard deviation $s_i$ of the training data for each class is found and recorded. In one version of the method, the covariance matrix for each class was found, inverted and recorded. A simpler version of the method uses only the diagonal part of the covariance matrix, which works well in experiments. At this point, the classifier is ready for testing as described in the next section.

Testing and Using the Classifier

Continuing with our example implementation of a Bayesian classifier, the classifier normalizes the metrics measured for a subject image in the test set (e.g., the digital watermark metrics and metrics measured from the image artwork (e.g., bar code artwork or a test pattern)) using the means and standard deviations of all training values found above.

Then, it compares the normalized data to each class. The distance to a class is the square root of the sum of $(data_i - m_i)^2/s_i$. The classifier chooses the class giving the smallest distance. Optionally, the classifier may be designed to prevent a decision if all the distances are small.

The classifier outputs the name of the class. For example, the output is "original" if the classifier found the class "original", and "copy" if the classifier found the class "ink-jet copy" or "photo copier copy".

The flexible nature of this classifier enabled us to evaluate a variety of print quality and information based metrics alone and in various combinations. As noted previously, it is advantageous to select metrics that are effective at measuring different types of distortion effects. One way to programmatically select these metrics is to measure the correlation among sets of metrics to determine which ones are correlated with each other, and thus, closely related to each other. Metrics that are highly correlated tend to measure the same distortion effects. Based on their correlation, metrics are sorted into groups, and then the best one or two metrics in each group are selected to be part of the classifier. To determine the superior metrics in each group, the metrics are ranked based on their ability to correctly distinguish between copies and originals using the classifier method.

The following table illustrates some examples of metrics and the type of effects that they measure.

TABLE 1

| Metric Name | Descripiton | Effect Measured |
|---|---|---|
| Bimodal Distribution Threshold of Pixel Value Histogram | This metric finds the minimum value over all thresholds-T of the within-class variance. This metric calculation is a way of finding an optimum threshold for a bimodal distribution. In it, for each candidate threshold T the | blurring |

TABLE 1-continued

| Metric Name | Descripiton | Effect Measured |
|---|---|---|
| | within-class variance is calculated as W(T) = P(<T)*Var(<T) + P(>=T)*Var(>=T) Where P(T) is the fraction of the distribution less than T and Var(<T) is the variance of that set, and similarly for P(>=T) and Var(>=T). The least value for W(T) indicates the strength of peaks in the pixel value distribution. | |
| Pixel Variance | The variance of the pixel values in the image is related to the amount of contrast, and to the degree of blur. | blurring |
| 1% Point on Histogram Distribution | This metric represents the gray level value on the histogram that is greater than 1% of the other pixel values in the distribution. | ink color |
| Ratio of pixel values that fall within Peaks on the Histogram | Minimum value of Sums(values ⅓ to ⅔ between peaks)/sum(between peaks) for sub-areas within image. | blurring at parts within image |
| Histogram Variance | Variance of pixel histogram | blurring |
| Histogram Variation Near Low Peak | Variance of pixel histogram below threshold. | blurring |
| Contrast | (High peak-low peak)/high peak, where the peaks correspond to peaks in the histogram of pixel values. | blurring |
| Ratio of energy in mid frequencies to total energy | Energy from DC+4 to ⅓ Nyquist/total energy | blurring |
| Ratio of energy in high frequencies to total energy | Energy from ⅓ Nyquist to 99% Nyquist/ total energy | cluster dot printing |
| Ratio of energy near Nyquist frequency to total energy | Energy near Nyquist freq/total energy | DPI of printer |
| Ratio of energy in Wavelet Subband to Total Energy in Wavelet Level | $3^{rd}$ level wavelet subband coeff/total $3^{rd}$ level, where the subband may be the approximation, horizontal, or vertical coefficients in the wavelet decomposition. | blurring |
| Mean Less | This metric extracts the high-frequency content of the image, and computes the ratio of the mean of the high frequency part to the total energy. The calculation is: MedianLess = mean((laplacian of image)^2)/total energy | blurring |
| Median Less | This metric extracts the high-frequency content of the image, and computes the ratio of the mean of the high frequency part to the total energy. The calculation is MedianLess = mean((image-medianfilter3×3 of image).^2)/total energy | Blurring |
| Sobel | This metric measures the total Sobel edge filter energy, both horizontal and vertical. The calculation is: Sobel = Mean(sobel vertical.^2 + sobel horizontal^2) )/total energy | weakened edges, blurring |
| Local Variation | This metric measures the local variation in non-edge areas of the image. Local variation is calculated on each 3×3 pixel area. The metric calculation is: LocVar =Mean(local variation)/total energy excluding edges | blurring |
| Fraction of Edge Pixels | This metric measures the fraction of pixels having large Sobel edge filter value, in order to calculate the total edge area of the image. | blurring |
| Ratio of White-Black Block Widths | This metric is measures the ratio of white to black sub block widths in the bar code as described above. | print growth |
| Standard Deviation of Block Widths | This metric is the standard deviation of the values used in finding the White-Black ratio | print growth |
| Digital Watermark Power Ratio | Analyzes power ratio of selected frequency coefficients of embedded signal. | Degradation of watermark signal |
| Digital Watermark Payload Recovery | Analyzes number of accurately recovered message symbols in digital watermark message payload | Degradation of watermark signal |

Related Enhancement Techniques

Here we describe enhancement techniques that are useful in improving the forensic analysis.

Image Enhancement

For forensic purpose, multiple scans permit generation of a more accurate image because several images of a watermark, together potentially contain more information than a single image. The resolution enhancement procedure, which is a process of intelligent image fusion, permits recovery of image information by minimizing the entropy of a set of piled-up images with respect to their respective registration. Improved information about the image formation process (i.e. if the image has been generated from a scanned image or directly printed from a bit map) can be gained from this procedure.

Copy Detect Enhancement

Although halftone screening has been designed mainly for performing the creation of graphic designs of high print quality, it also incorporates several important anti-counterfeiting features that can be applied to fragile watermarking. Modulated halftone screening techniques can be used for generating screen dots at varying frequencies and orientations, which are inducing strong moiré effects when scanned by a digital color copier or a desktop scanner. Variable cluster size of printed dots (robust halftoning) will induce a different reproduction behavior (dot gain) as each screen element size is modulated (Phase modulation). Therefore when trying to reproduce an original by analog means, such as a photocopier, the variations in dot gain will induce strong intensity variations produced by the variable frequency screen elements.

Examples of Application

Figure 2:
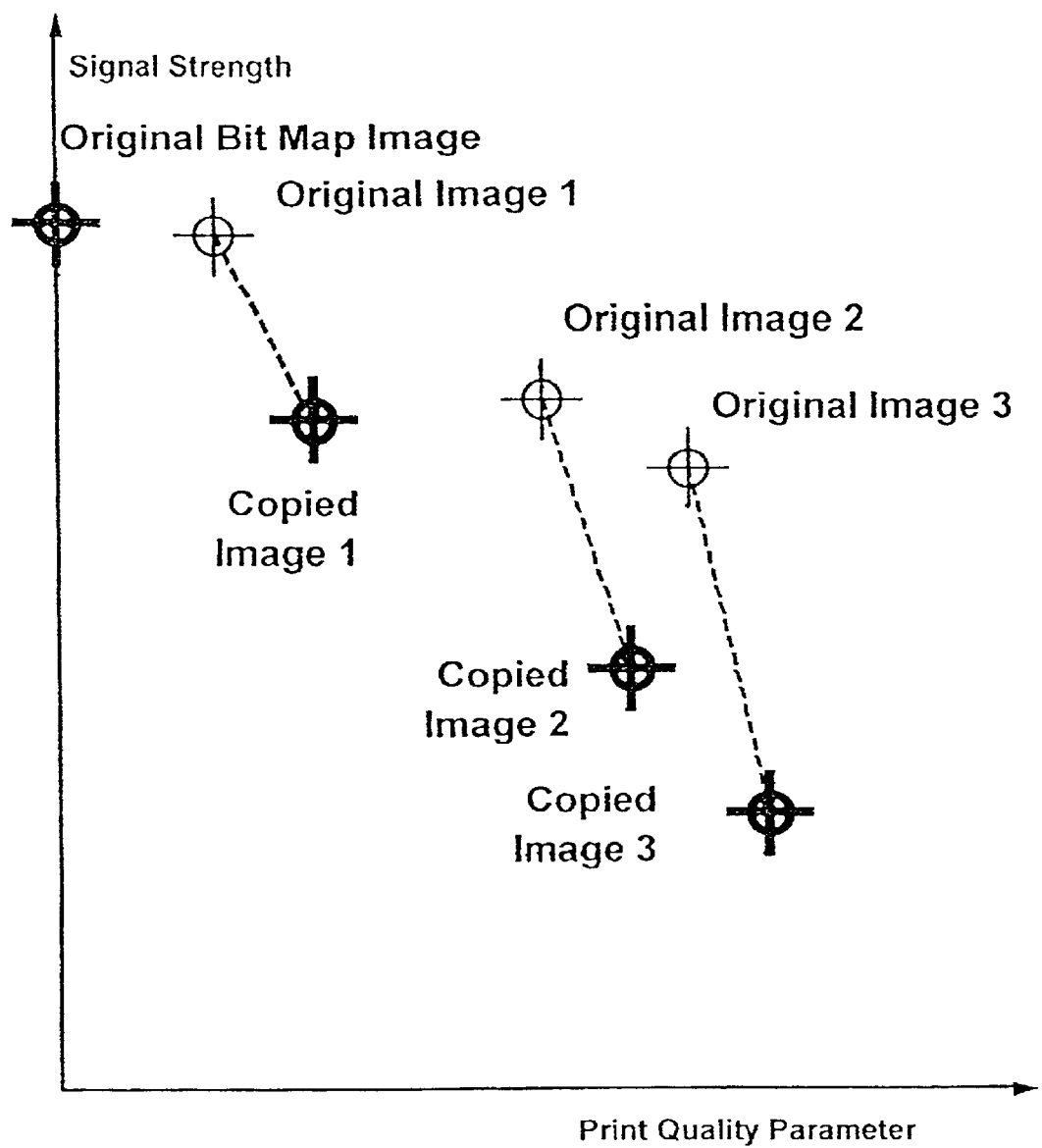
FIG. 2 shows a plot of the watermark signal strength of original and copied images against a print quality parameter.

FIG. 2 shows a plot of the watermark signal strength of original and copied images against a print quality parameter for 3 original images and 3 copies on different papers, which, for illustration purpose could be the print growth described above. Based on the watermark signal strength alone, it is sometimes difficult to decide on the status of a printed image. Copied image 1 has a higher signal strength than original image 3. Similar observations can be made with respect to the print quality parameters of the original and copied images. In this example, it is not possible without further knowledge to set a single threshold value for the watermark signal strength that will accurately detect copies. Only with the experience provided by multiple and repeated measures on various papers and printers can we determine a threshold for each class of printers/scanners or copiers.

Figure 3:
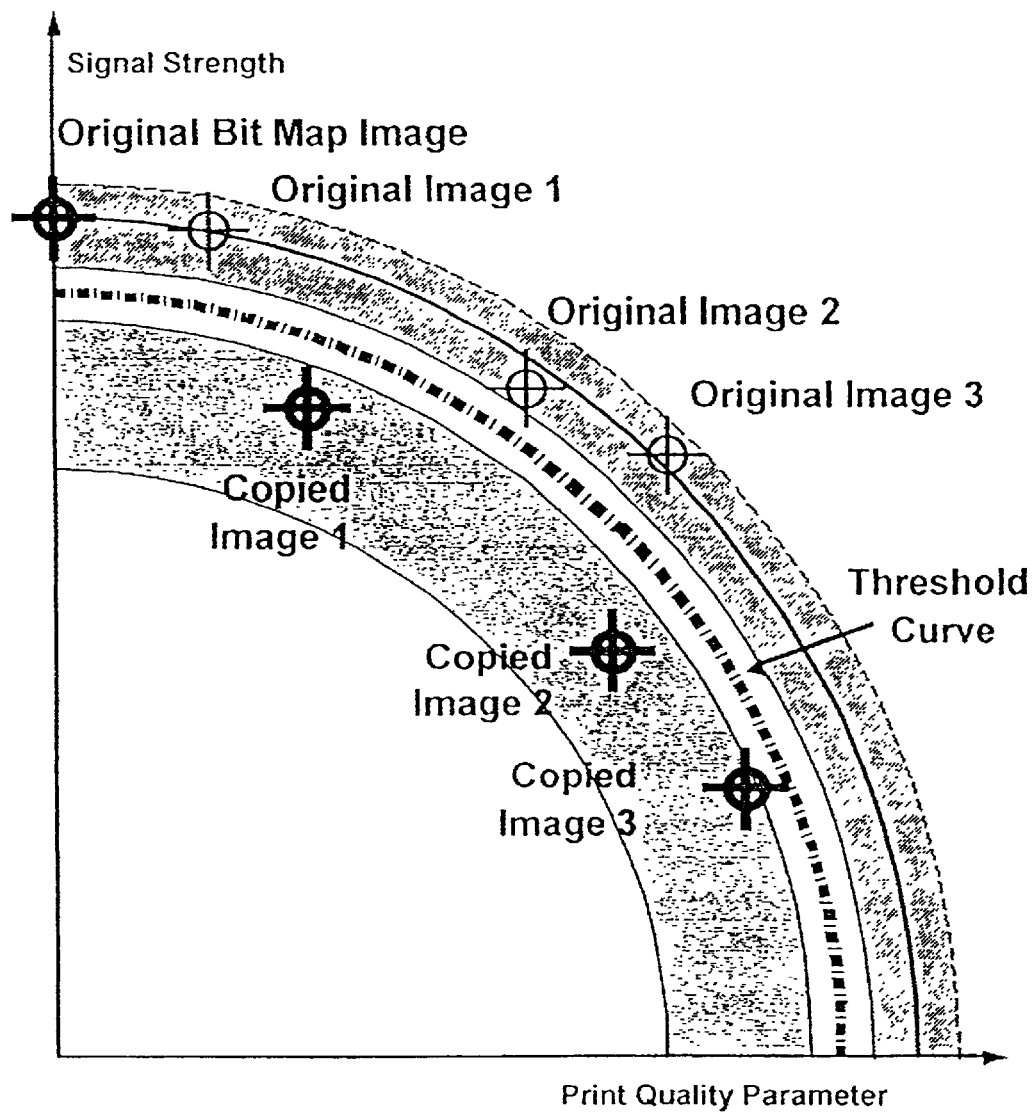
FIG. 3 exhibits the same plot of the watermark signal strength of original and copied images against a print quality parameter, but for many measurements on various printers and papers and means of copying.

FIG. 3 exhibits the same plot of the watermark signal strength of original and copied images against a print quality parameter, but for many measurements on various printers and papers and means of copying. Now we recognize that the points representing the watermark signal strength of the original images against the print quality parameter lie in a narrow band, while the points representing the watermark signal strength of the copied images lie in another and distinct band. The two bands do not overlap and are separated by a gap in which a threshold curve can be drawn.

Figure 4:
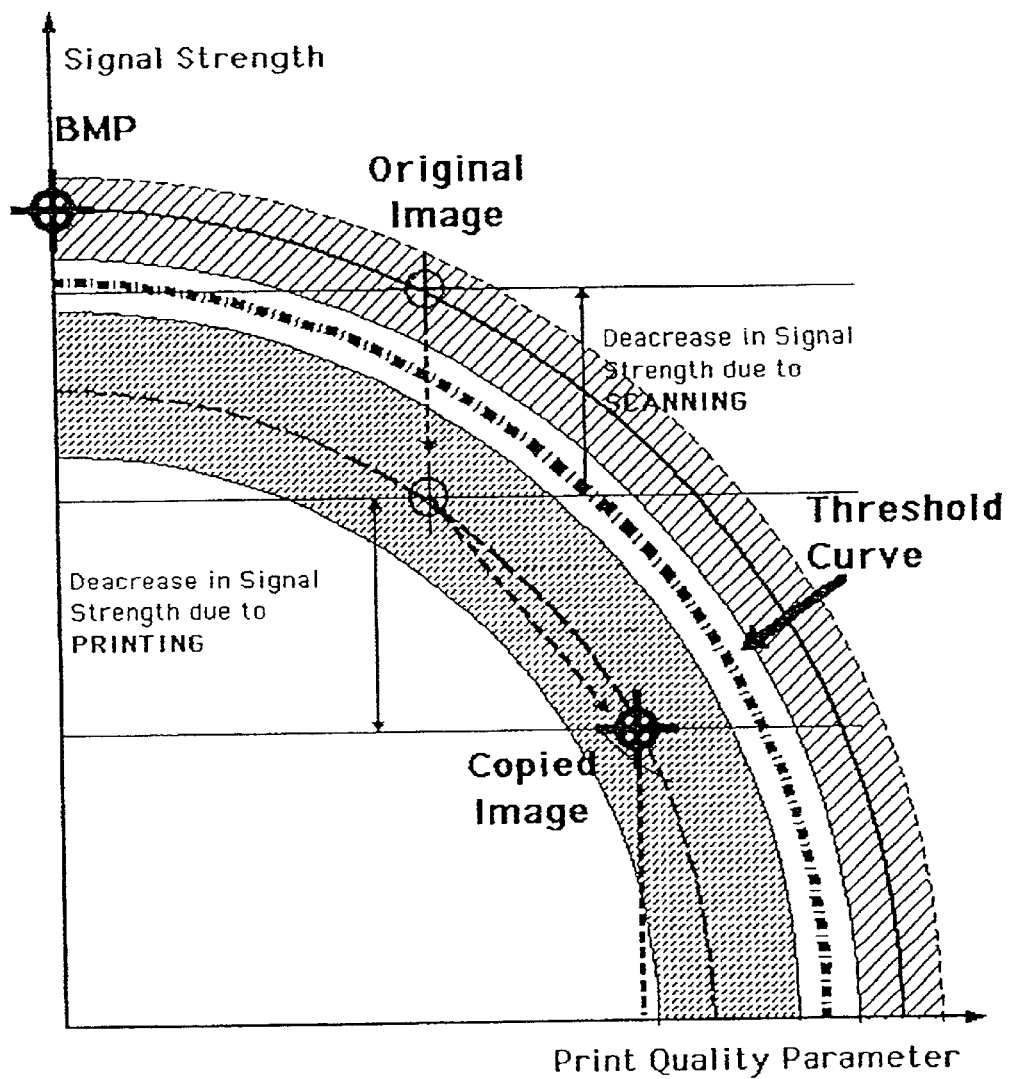
FIG. 4 exhibits a more detailed plot of the loci of the watermark signal strength of an original and a copied image against the print quality parameter.

FIG. 4 exhibits a more detailed plot of the loci of the watermark signal strength of an original and a copied image against the print quality parameter. The decrease of the watermark signal strength from the original to the copied image occurs in two steps: first by the fact that the original image is scanned and losing details in the digital scanning process, then when the scanned image is printed to produce an illegal copy with print growth distortion.

Comparison of these two parameter values with a pre-stored look-up table or a predefined classifier permit the selection of an appropriate watermark strength threshold value, depending on the printing circumstances and materials used, to accurately determine if the watermark is an original or a copy.

This authentication system improves the accuracy of detection of copies by printing known artwork features as well as hidden data pertaining to the original bit map in the image containing the watermark. Examples of artwork features that could be used include line segments or geometrical shapes such as circles or square of known dimension. After scanning the image, these features are analyzed in terms of print quality and the threshold values for the watermark strength (quality metric) are adjusted to accurately determine if the watermark is an original or a copy. This dynamic adjustment makes it possible for accurate copy detection over a wide range of media and printing conditions similar to those found in the mailing industry.

As described above, the print quality metrics can be used to assess ink type (e.g., color), paper type (e.g., glossy, recycled, etc.), and printer type (halftone screen characteristics, dot resolution and spacing). These measurements can then be used to adaptively set the thresholds for digital watermark metrics such as the symbol error or power ratio metric.

Figure 5:
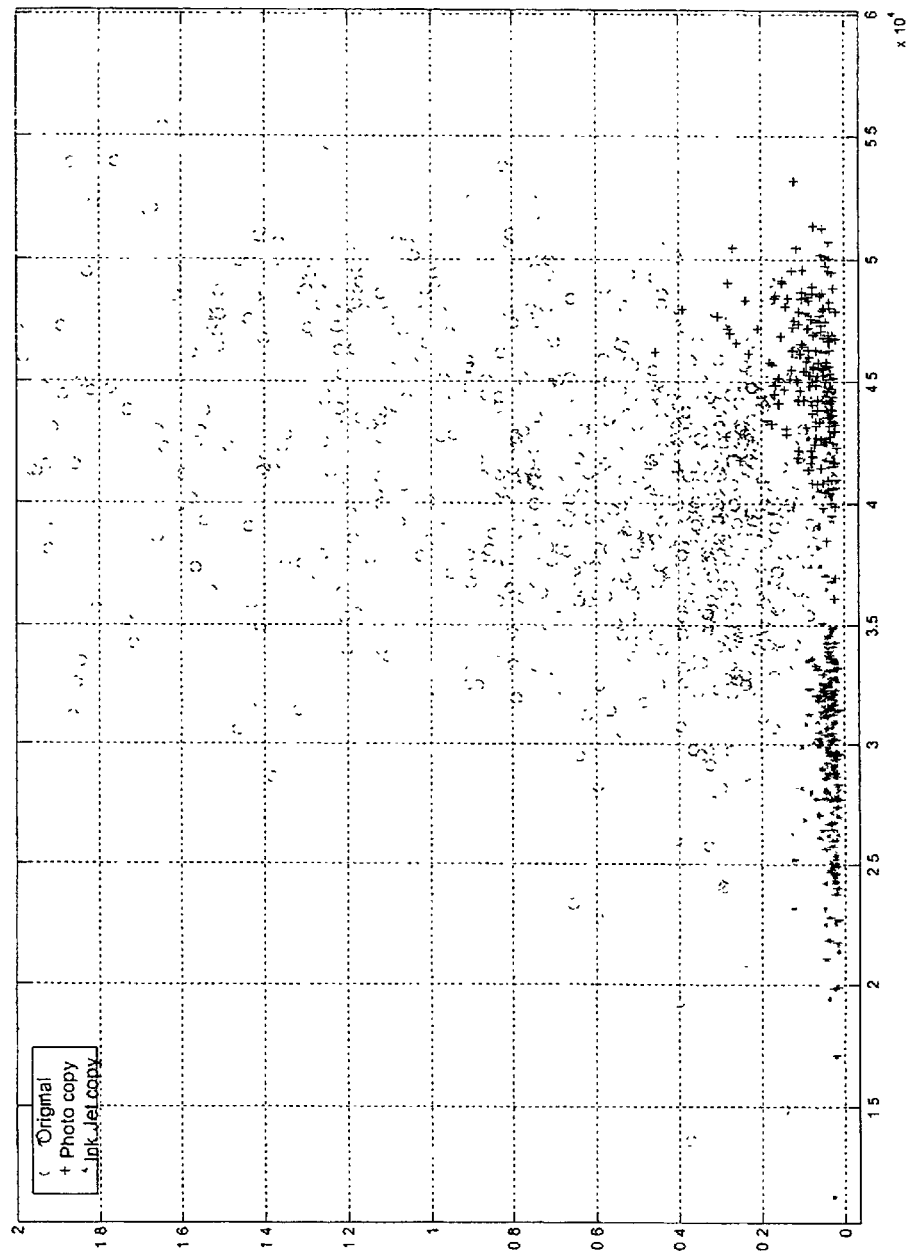
FIGS. 5–7 illustrate results of experiments using digital watermark metrics in combination with print quality metrics.
Figure 6:
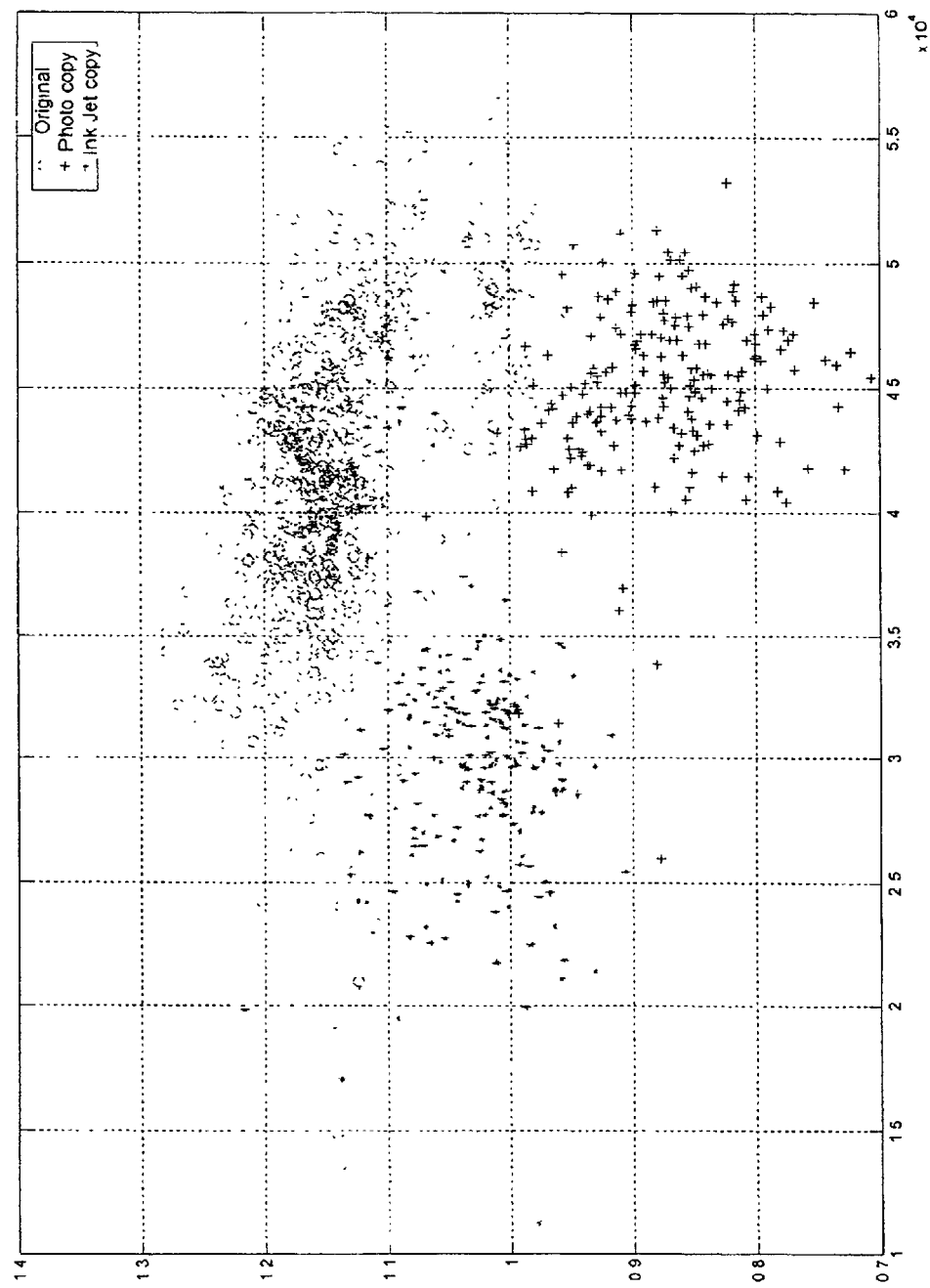
Figure 7:
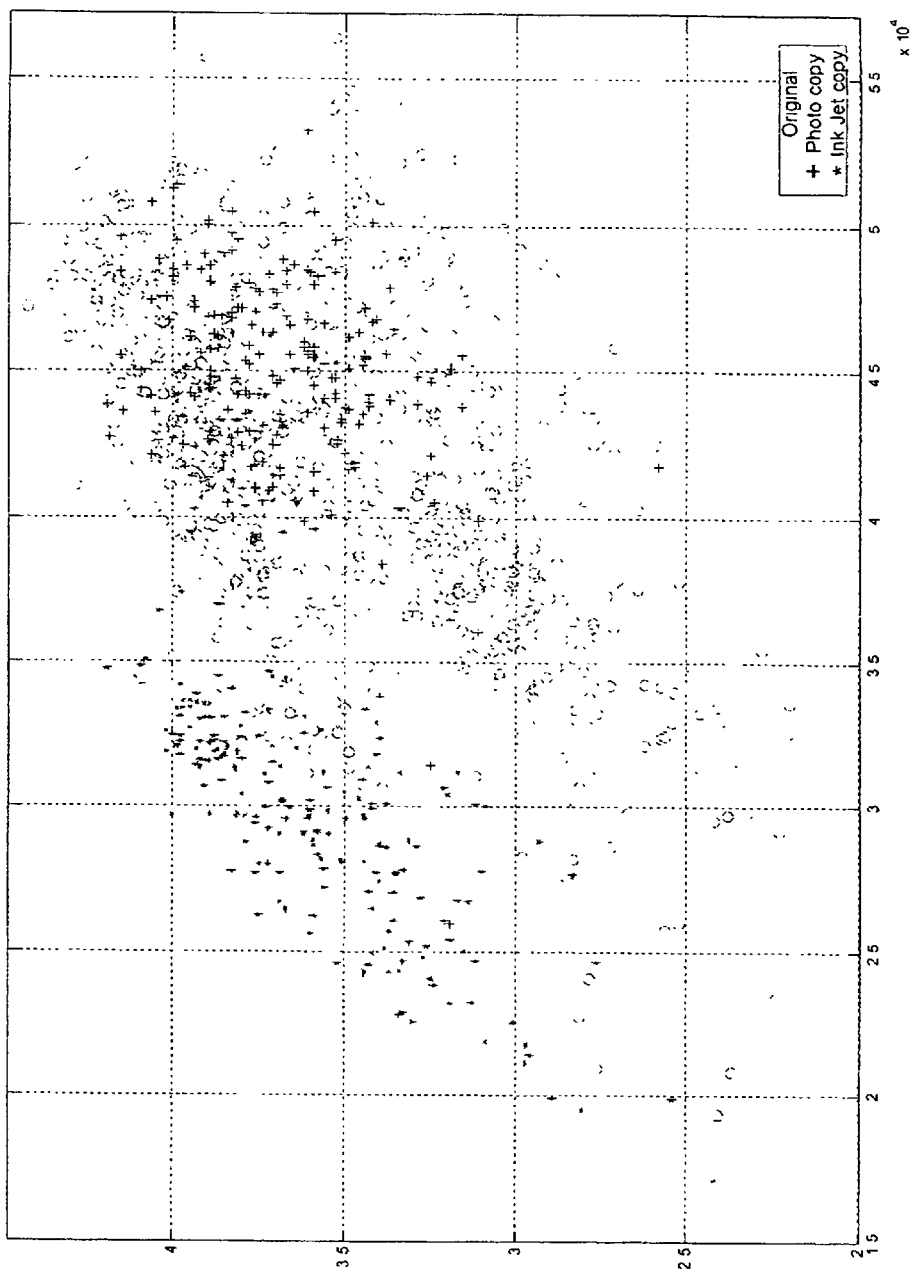

FIGS. 5–7 illustrate results of experiments using digital watermark metrics in combination with print quality metrics. In each diagram, the horizontal axis represents an information-based, digital watermark metric, referred to as a Watermark Message Symbol Based Metric. Also, in each diagram, classes of subject images are denoted by circle (original), asterisk (ink jet copy) and plus (photo copy) marks. In FIG. 5, the vertical axis represents an energy-based metric that measures a ratio of energy near the Nyquist frequency to the total energy. This metric evaluates spatial resolution information of the subject image to evaluate whether it was likely printed using the original printer at a known DPI, or some other DPI.

In FIG. 6, the vertical axis represents a histogram metric that measures a low point (where values are 1% or lower) on the histogram of pixel luminance values in the subject image. This metric evaluates ink color because the low point on the distribution is indicative of the ink color.

In FIG. 7, the vertical axis represents a print growth metric that measures a ratio of widths of artwork features in the subject image. In this particular case, the artwork comprises black and white blocks in a 2D bar code used in a postal indicia.

Note that in the examples of FIGS. 5–7, the metrics for the three classes fall into clusters that form class regions within the metric space. The statistical model classifier described above first identifies these class regions on a test set of images with a known class and then uses metric measurements to map subject image with unknown classes into one of the class regions formed in a multi-dimensional metric space.

Embedding and Detecting Digital Watermarks

Having described the authentication system, we now turn to the digital watermark components of the system in more detail. This section describes how to generate, embed and detect digital watermarks in print objects.

There are a variety of ways to generate the watermark signal. One approach is to take an auxiliary message comprising binary or M-ary symbols, apply error correction coding to it, and then spread spectrum modulate the error correction encoded message. One way to spread spectrum modulate the message is to spread each binary symbol in the message over a pseudorandom number, using an exclusive OR operation or multiplication operation. The resulting binary message elements in the spread spectrum modulated message signal are then mapped to spatial image locations. The watermark signal may be expressed in a binary antipodal form, where binary symbols are either positive or negative. To increase robustness, the spread spectrum modulated message signal may be repeated throughout the host image, by for example, embedding the message signal in several blocks of the host image. In particular, the watermark encoder may embed instances of the watermark signal into contiguous blocks of pixels throughout a portion of the host image or throughout the entire host image.

Perceptual modeling may be applied to the host image to calculate a gain vector with gain values that correspond to the message signal elements. For example, in the case where the upsampled watermarked signal is added to the host signal, the gain values may be used to scale binary antipodal values of the message signal before adding them to the host signal. Each gain value may be a function of desired watermark visibility and detectability constraints. In particular, the perceptual model analyzes the image to determine the extent to which it can hide a corresponding element of the watermark image. One type of analysis is to compute local contrast in a neighborhood around each pixel (e.g., signal activity) and select gain for pixel as a function of local contrast. A detectability model analyzes the host signal to determine the extent to which pixel values are biased toward the value of the watermark signal at the corresponding pixel locations. It then adjusts the gain up or down depending on the extent to which the host image pixels are biased towards the watermark signal.

In one implementation, we generate the digital watermark signal as follows:

1. Take a desired watermark message payload comprising an N bit binary string.
2. Perform error correction encoding of the message, such as convolution coding, turbo coding, etc.
3. Spread each bit of the error correction encoded message over a pseudorandom carrier signal by, for example, taking the XOR of the bit value with each value in the pseudorandom carrier;
4. Map the spread signal values to pixel locations in a watermark image block.
5. Convert spread signal to multilevel per pixel watermark signal. At this stage, the spread signal values are binary, e.g., {1, 0}, or {1,-1} representing increases or decreases in corresponding sample values (e.g., luminance, gray level, intensity, etc.) Each binary value corresponds to one or more neighboring pixels in the watermark signal. These binary values may be converted to multilevel values by adjusting a midlevel pixel value (e.g., mid level gray value of 128 in an 8 bit pixel) up or down corresponding to the value of the spread signal. The gain of the watermark signal may be adjusted by applying a scale factor to the spread signal. Further, the changes from each bit of the spread signal may be made to smoothly vary over the corresponding pixels in the neighborhood.

There are a variety of techniques to create the spread signal, such as convolving the message with the carrier, multiplying a binary antipodal message signal with a binary antipodal carrier, etc. The carrier may be used for synchronizing the detector with the watermark in a watermarked signal. Also, as detailed above, an orientation signal may be added to the spread signal to assist in calibration.

A digital watermark may be embedded into a halftone image in a variety of ways. One way is to integrate the watermark embedding with the halftoning process. For example, the digital watermark may be used to modulate error diffusion thresholds, or may be used as the halftone screen. Alternatively, the watermark may be embedded without modifying the halftoning process. For example, a multilevel per pixel watermark signal is created at the resolution of a target halftone image. The watermark encoder produces the multilevel per pixel watermark signal at the desired resolution of the halftone image, or at some other resolution and up or down samples it to match the resolution of a target halftone image. This watermarked signal is then added to the host image at the same spatial resolution to create a composite, watermarked image. The error diffusion process or some other type of halftone process may then be applied directly to this composite image to generate a watermarked halftone image. This technique applies to a variety of halftone processes including ordered dithering (e.g., blue noise masks, clustered dot halftones, etc.) as well as error diffusion halftone processes.

A digital watermark may be embedded into a halftone image by using the digital watermark signal as a halftone screen. The following discussion illustrates an example of the process:

1. Create a digital watermark signal, for example, using spread spectrum techniques described above. Optionally, the watermark signal may include an orientation signal, such as a pseudorandom carrier signal that yields a pattern of signal peaks when transformed into the autocorrelation domain or an orientation signal that yields a pattern when transformed into a frequency domain, such as the Fourier domain.

The resulting watermark signal is a multi-level per pixel gray scale image or array of luminance values. It has a known block size, such as 64 by 64, 128 by 128, 256 by 256 pixel elements that can be tiled contiguously to create an image of varying sizes.

2. Calculate a histogram of the watermark image block.
3. Use the histogram to set halftone threshold levels for corresponding gray values (or luminance values). This example uses gray levels, but the same technique applies to luminance values as well as other color channels of color images. These halftone threshold levels are later used to convert a multilevel pixel value to a binary state of "on" or "off" of a halftone pixel by comparing the multilevel pixel value to the threshold and setting the halftone pixel at that location to a zero or one depending on whether the multilevel pixel value is less or greater than the threshold.

For each discrete gray value between 0–255, for example, the method picks a threshold level that, when applied to the multilevel pixel values in the watermark image block, the resulting halftone image has a tone density that achieves the desired gray value.

If the same watermark signal is to be embedded in several halftone images, the thresholds set by this process may be used over and over to create watermarked halftone images with the same embedded signal. Here's how the process of creating the halftone image operates:

1. Upsample or otherwise convert the target host multilevel per pixel image to the halftone dot resolution. Also, upsample or otherwise convert the multilevel per pixel watermark block to the halftone dot resolution, and if necessary, tile the blocks in a contiguous pattern across the target image so that the watermark signal is coextensive with the target image.
2. For each multilevel pixel value in the upsampled image, look-up the corresponding halftone threshold level that corresponds to that level.

3. Apply the threshold to the corresponding multilevel per pixel value in the watermark signal to get a halftone dot value that is either a zero or one. When the halftone conversion process of stages 2 and 3 is complete, the result is a watermarked halftone image that may be printed on paper or other objects.

Each halftone dot in the watermarked halftone image is either ink (minimum luminance,) or no ink (maximum luminance). As such, a high luminance value in the target host image sets a threshold such that a corresponding pixel in the watermark image is more likely to be set to the "no ink" state. Conversely, a low luminance value in the target image sets a threshold such that a corresponding pixel in the watermark image is more likely to be set to an "ink present" state.

This process of converting an image to a watermarked halftone image may be applied to one or more color planes in a color halftone image.

If the target host image is a simple gray level image with only a few different gray levels, then the above technique can be used to set thresholds for each of the gray levels in the host image. Also, while the host image may have several gray levels, these gray levels can be divided into ranges, where each range is assigned a single halftone threshold. Masks can then be calculated to define the areas of the host image that correspond to each of the halftone thresholds. Finally, the halftone threshold corresponding to the particular mask is applied to the watermark signal areas covered by the mask to create a watermarked halftone image.

Consider the following example where the host image has three gray levels, each with a corresponding mask defining the areas of the image where those gray levels reside. This method now thresholds the multilevel per pixel watermark signal, coextensive with the target image, based on three different masks that correspond to areas of a particular tonal density in the target image:

Mask 1 has tonal density D1, and uses threshold T1

Mask 2 has tonal density D2, and uses threshold T2

Mask 3 has tonal density D3, and uses threshold T3.

This type of watermark may be read from the watermarked halftone image or other image representations of that watermarked image, such as a multilevel per pixel representation of the image at a resolution sufficiently high to represent the watermark signal. To decode the watermark, a watermark decoder detects the presence and orientation of the watermark in the watermarked image. It then performs an inverse of the embedding function to extract an estimate watermark message signal.

The watermark decoder reconstructs an embedded message from the estimated watermark signal by:

1. aggregating estimates of the same message element in repetitively encoded instances of the message;
2. performing spread spectrum demodulation, and
3. error correction decoding.

In one implementation, the decoder uses an orientation signal component of the watermark to detect its presence and orientation in the watermarked image. It then performs a predictive filtering on the image sample values to estimate the original un-watermarked signal, and subtracts the estimate of the original from the watermarked signal to produce an estimate of the watermark signal. It performs spread spectrum demodulation and error correction decoding to reconstruct an auxiliary message embedded in the watermarked signal.

For more details about embedding an image watermark, and detecting and reading the watermark from a digitized version of the image after printing and scanning see assignee's co-pending application Ser. No. 09/503,881 and U.S. Pat. No. 5,862,260, which are hereby incorporated by reference. In order to make the watermark robust to geometric distortion, the watermark includes an orientation watermark signal component. Together, the watermark message signal and the orientation watermark signal form the watermark signal. Both of these components may be added to a host image at the resolution of the halftone image before the host image is converted to a halftone image. Alternatively, these components may be combined to form the watermark signal used in modulating the error diffusion threshold used in an error diffusion type halftone process.

One type of watermark orientation signal is an image signal that comprises a set of impulse functions in the Fourier magnitude domain, each with pseudorandom phase. To detect rotation and scale of the watermarked image (e.g., after printing and scanning of the watermarked image), the watermark decoder converts the image to the Fourier magnitude domain and then performs a log polar re-sampling of the Fourier magnitude image. A generalized matched filter or impulse match filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

Digital Watermark Metrics

There are a number of possible metrics for measuring digital watermark strength. In this section, we describe two examples.

Power Ratio

The power ratio metric measures the degradation of the watermark signal at selected frequencies. To explain this metric, we start with explanation of how the digital watermark is embedded, and then describe how the metric is measured in the watermark decoder.

The embedder begins by dividing the original image into N×N blocks of samples at a specified resolution, where N is a pre-defined integer. For each block, the embedder computes a frequency transform of the image samples in that block, namely, a fast Fourier transform. From the mid-frequency and mid-high frequency coefficients, the embedder selects M Fourier transform coefficients, where M is a pre-defined integer. The coefficient locations are fixed by a pre-defined pattern. For example, the locations are scattered among roughly 25 to 100 coefficient locations in the mid to mid-high frequency range of a Fourier transform domain of a block of image samples where N ranges from 64 to 512 at spatial resolutions ranging from 75 to 600 dots per inch (DPI). The locations are symmetric about vertical and horizontal axes (and potentially diagonal axes) to facilitate detection as explained further below.

For each of the M selected coefficients, x, the embedder computes a ratio of the magnitude of a selected coefficient relative to the magnitude of its neighbors. In particular, it is a ratio of the magnitude of the selected coefficient to the average magnitude of the surrounding neighbors:

$$r(x) = \text{Magnitude\_of\_}x / \text{Average\_of\_Magnitude\_of\_Eight\_Neighbors\_of\_}x$$

If r(x)<r, where r is a pre-defined reference value, the embedder increases the magnitude of x such that:

$$r(x)=r.$$

In this implementation, the value of r is a pre-defined constant. The reference may be derived dynamically from the input media signal. Also, the reference may be selected from a table of values so as to select the value of r in the table at the minimum distance from r(x). The adjustment to the host image is selected so as to be imperceptible or substantially imperceptible to a user in an output form of the watermarked signal.

In one implementation, this approach has been modified as follows:

1. If Average_of_Magnitude_of_Eight_Neighbors_of_x is less than a pre-set minimum magnitude MinMag, then increase Average_of_Magnitude_of_Eight_Neighbors_of_x to be MinMag, and set the magnitude of x to be r*MinMag.
2. If Magnitude_of_x is greater than a pre-set maximum magnitude MaxMag, then decrease Average_of_Magnitude_of_Eight_Neighbors_of_x to be MaxMag/r.
3. If the conditions of 1 or 2 are not satisfied, increase the magnitude of x such that r(x)=r.

The first condition (item 1) enables the relationship between neighboring coefficients to survive the printing of an original when the average magnitude of the coefficients is small. The second condition (item2) improves the quality of the image in cases where the magnitude of the coefficient is large. In particular, when the magnitude of x is large, further increases to x will likely have an adverse impact on image quality.

The frequency coefficients may be selected so that the digital watermark signal at these coefficients act as both a calibration signal and an authentication signal. For example, the locations of the coefficients for the power ratio metric and the delta functions of the calibration signal are the same.

The process of calculating the power ratio metric in the decoder is as follows. The first four steps are the same as shown in the embedder. For each block, the detector computes the average of r(x), where x is over all M selected coefficients (124), $$R=\text{Average\_of\_}r(x)$$

The detector computes the average of R over all blocks, $$AR=\text{Average\_of\_}R$$

A related approach is to use a weighted average as follows. For each block, the detector computes a weighted average of r(x), where x is over all M selected coefficients (124), $$R=\text{Sum\_of\_(weight\_for\_location\_}x*r(x))$$

In this approach, the weights are fixed positive constant, independent of the image, with the weight sum equal to 1. For copy detection applications, the weight for each location is adapted for printers and printing substrates used to produce original printed items.

The weighting factors are determined such that, for these printers and substrates, originals will be statistically optimally differentiated from copies. Based on our experiments, the weights in higher frequency components are usually higher. However the weights in the highest frequency components are actually tuned lower, because some reproduction devices (like photo copy machines) capture the highest frequency reasonably well, and the first (original) printing process introduces noise to the highest frequency components in the original printed items.

After obtaining the weighted average R for each block, the detector computes the average of R over all blocks, $$AR=\text{Average\_of\_}R''$$

To detect whether the watermarked signal has undergone alterations, the detector compares the average of R with a pre-defined threshold. If AR>=T, where T is a pre-defined threshold, then the detector classifies it as original. If AR<T, then the detector classifies it as a copy.

Payload Recovery Assessment: Watermark Message Symbol Based Metric

There are a variety of additional metrics for assessing watermark strength, including the degree of correlation between the reference signal and the detected signal, and a measure of symbol errors in the raw message estimates. One way to measure the symbol errors is to reconstruct the raw message sequence using the same error correction coding process of the embedder on the valid message extracted from the watermark. This process yields, for example, a string of 1000 binary symbols, which can be compared with the binary symbols estimated at the output of the spread spectrum demodulator. The stronger the agreement between the reconstructed and detected message, the stronger the watermark signal.

More specifically, an approach for measuring the strength of the watermark signal is as follows:

1. Use the message payload read from the watermark to re-create the original embedded bit sequence (including redundantly encoded bits from error correction coding) used for the watermark.
2. Convert the original bit sequence so that a zero is represented by −1 and a one is represented by 1.
3. Multiply (element-wise) the soft-valued bit sequence used to decode the watermark by the sequence of step 2.
4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, etc.
5. Compare the strength measures to thresholds to decide if the suspect image has been captured from an original or a copy of the printed object. The threshold is derived by evaluating the difference in measured watermark strength of copied vs. original printed objects on the subject printer platform used to create the original, and a variety of copiers, scanners and printers used to create copies.

This same technique of measuring symbol errors can be applied to two or more different watermarks embedded at different spatial resolutions. Each of the watermarks may have the same or different message payloads. In the first case where the watermarks have the same message payloads, the message extracted from one of the watermarks may be used to measure bit errors in each of the other watermarks. For example, the message payload from a robust watermark embedded at a low spatial resolution may be used to measure the bit errors from a less robust watermark at a higher spatial resolution. If the watermarks carry different message payloads, then error detection bits, such as CRC bits, can be used in each message payload to ensure that the message is accurately decoded before re-creating the original, embedded bit sequence.

Using two or more different watermarks enables a threshold to be set based on the ratio of the signal strength of the watermarks relative to each other. In particular, the signal strength of a first watermark at a high resolution (600–1200 dpi) is divided by the signal strength of a second watermark at a lower resolution (75–100 dpi). In each case, the signal strength is measured using a measure of symbol errors or some other measure (e.g., correlation measure).

If the measured strength exceeds a threshold, the detector deems the watermark signal to be authentic and generates an authentication signal. This signal may be a simple binary value indicating whether or not the object is authentic, or a more complex image signal indicating where bit errors were detected in the scanned image.

In the previous sections, we described a number of functions that the digital watermark performs, including carrying a message payload including a printer identifier and print attribute information (e.g., ink, printer and paper attributes), aligning an image to its original orientation, providing metrics for copy detection, etc. These functions may be performed using different digital watermarks or watermark layers. For example, a robust watermark, embedded at a low-mid frequency range to survive copying, may be used to carry the message payload, while a fragile watermark, embedded at a mid-high frequency range sensitive to copying distortion, may be used for measuring copy detection metrics.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A printed object authentication system comprising:
   a print quality processor for measuring one or more print quality metrics from a subject image scanned from a printed object;
   a message decoder for extracting message symbols from the subject image and determining an information based metric based on accuracy of the symbols extracted from the subject image; and
   a classifier in communication with the decoder and processor for receiving the print quality and information based metrics and classifying the subject image as an original or copy as a function of each of the metrics.

2. The system of claim 1 wherein the message decoder comprises a digital watermark decoder for extracting the message symbols embedded in the subject image.

3. The system of claim 1 wherein the print quality and information based metrics are related such that values of the metrics do not change in the same manner in response to image degradation due to copying of the printed object.

4. The system of claim 1 wherein information is embedded in the subject image that is used to evaluate the one or more print quality metrics.

5. The system of claim 4 wherein the information includes a parameter describing attributes of artwork features in the subject image.

6. The system of claim 4 wherein the information includes a parameter describing attributes of a printer used to print an original version of the printed object.

7. The system of claim 4 wherein the information includes a parameter describing attributes of ink or paper type used to print an original version of the printed object.

8. The system of claim 4 wherein the information identifies a type of classifier to be used in classifying the subject image.

9. The system of claim 1 wherein the print quality parameter is a measure of attributes of a printer used to print the printed object.

10. The system of claim 1 wherein the print quality parameter is a measure of print growth.

11. The system of claim 1 wherein the print quality parameter is a measure of blurring in the subject image.

12. The system of claim 1 wherein a bar code metric measured from a bar code in the subject image is used to classify the subject image.

13. The system of claim 12 wherein the message decoder comprises a bar code reader, and the bar code metric corresponds to the information-based metric based on recovery of symbols encoded in the bar code.

14. The system of claim 12 wherein the bar code metric corresponds to a print quality metric.

15. The system of claim 14 wherein the information based metric corresponds to a metric determined from reading message symbols carried in a digital watermark embedded in the subject image.

16. The system of claim 1 wherein the subject image comprises a postal indicia on the printed object.

17. A method for embedding auxiliary information into an image to be printed on a printed object and used to authenticate the printed object, the method comprising:
   embedding auxiliary information into the image so that the auxiliary information degrades in response to a copy operation on the printed object; and
   embedding print information about a print attribute into the image, such that the auxiliary information includes the print information.

18. The method of claim 17 wherein embedding auxiliary information comprises embedding a digital watermark carrying the auxiliary information in the image.

19. The method of claim 17 wherein the print attribute includes a property of a printer used to print the printed object.

20. The method of claim 17 wherein the print attribute includes a property of ink used to print the printed object.

21. The method of claim 17 wherein the print attribute includes a property of paper used to print the printed object.

22. A printed object including embedded information created by the method of claim 17.

23. The printed object of claim 22 wherein the printed object comprises mail with a postal indicia carrying the embedded auxiliary information.

24. The method of claim 17 wherein embedding the auxiliary information in the image comprises generating the image for printing on the printed object, the image having characteristics that convey the auxiliary information, and machine readability of the auxiliary information in the image degrades in response to the copy operation.

25. method of claim 17 wherein embedding of the auxiliary information in the image comprises adjusting values of the image to embed the auxiliary information in the image, and machine readability of the auxiliary information in the image degrades in response to the copy operation.

26. The method of claim 17 wherein machine readability of the auxiliary information in the image degrades in response to the copy operation.

27. The method of claim 26 wherein the readability of the auxiliary information is used to measure whether the printed object is an original.

28. A computer readable medium on which is stored instructions for performing the method of claim 17.

29. A printed object authentication system comprising:
 a print quality processor for measuring one or more print quality metrics from a subject image scanned from a printed object;
 a digital watermark decoder for detecting a digital watermark from the subject image and determining a digital watermark metric based on the detected digital watermark in the subject image;
 a classifier in communication with the decoder and processor for receiving the print quality and digital watermark based metrics and classifying the subject image as an original or copy as a function of each of the metrics.

30. The system of claim 29 wherein the digital watermark metric measures strength of an embedded digital watermark to detect degradation of the subject image due to copying.

31. The system of claim 29 wherein the digital watermark metric measures accuracy of recovery of embedded message symbols carried in the digital watermark.

32. The system of claim 29 wherein the subject image comprises a postal indicia on the printed object.

33. A method for authenticating a printed object comprising:
 measuring one or more print quality metrics from a subject image scanned from the printed object;
 extracting message symbols from the subject image and determining an information based metric based on accuracy of the symbols extracted from the subject image; and
 classifying the subject image as an original or copy as a function of each of the metrics.

34. The method of claim 33 including:
 using a print quality metric to set an adaptive threshold for the information based metric, and classifying the subject image as an original or copy by evaluating the information based metric against the adaptive threshold.

35. The method of claim 33 including:
 using a statistical model classifier, which has been trained on a test set of originals and copies as a function of each of the metrics, to classify the subject image as an original or copy.

36. A computer readable medium on which is stored instructions for performing the method of claim 33.

37. A method of authenticating printed objects comprising:
 measuring one or more print quality metrics from a subject image scanned from a printed object;
 detecting a digital watermark from the subject image and determining a digital watermark metric based on the detected digital watermark in the subject image; and
 classifying the subject image as an original or copy as a function of each of the metrics.

38. The method of claim 37 including:
 using a print quality metric to set an adaptive threshold for the information based metric, and classifying the subject image as an original or copy by evaluating the information based metric against the adaptive threshold.

39. The method of claim 37 including:
 using a statistical model classifier, which has been trained on a test set of originals and copies as a function of each of the metrics, to classify the subject image as an original or copy.

40. A computer readable medium on which is stored instructions for performing the method of claim 37.

* * * * *